United States Patent [19]

Bozer et al.

[11] 3,850,727

[45] Nov. 26, 1974

[54] METHOD OF FABRICATION OF FURAN RESIN BONDED, FIBER REINFORCED ARTICLES

[75] Inventors: Keith B. Bozer; Lloyd H. Brown, both of Crystal Lake; Robert H. Fox, Hoffman Estates, all of Ill.

[73] Assignee: The Quaker Oats Company, Chicago, Ill.

[22] Filed: Apr. 16, 1973

[21] Appl. No.: 351,131

[52] U.S. Cl........ 156/335, 117/126 GB, 117/161 L, 161/93, 161/198, 161/258, 161/DIG. 4, 252/441, 260/56, 260/67 FA, 260/80 C
[51] Int. Cl. ..... C09j 5/00, B32b 27/42, B32b 17/04
[58] Field of Search... 117/126 GB, 126 GQ, 161 L; 156/308, 335; 161/93, 98, 257, 258, DIG. 4; 260/37 R, 56, 67 FA, 80 C, 88.5, 346.1 R, 347.8; 252/441

[56] References Cited
UNITED STATES PATENTS

| 3,594,345 | 7/1971 | Brown et al................. 260/37 R |
| 3,597,386 | 8/1971 | DeBrabander.................. 260/37 |
| 3,681,286 | 8/1972 | Brown et al................... 260/67 FA |
| 3,681,287 | 8/1972 | Brown et al................... 260/67 FA |
| 3,700,604 | 10/1972 | Metil............................. 252/428 |
| 3,725,333 | 4/1973 | Adkins et al................... 260/38 |

*Primary Examiner*—Charles E. Van Horn
*Assistant Examiner*—Robert A. Dawson
*Attorney, Agent, or Firm*—Joseph P. O'Halloran

[57] ABSTRACT

A method of fabricating fiber reinforced furan resin bonded articles is disclosed. In the disclosed method, fiber reinforcement, preferably glass fiber, is immersed, or otherwise embedded in a catalyzed liquid furan resin in which the liquid resin is so constituted to provide a working life or bench life in which the viscosity of the liquid resin is substantially stable, and in which the resin system is further characterized as having rapid cure at room temperature after the working life.

22 Claims, No Drawings

METHOD OF FABRICATION OF FURAN RESIN BONDED, FIBER REINFORCED ARTICLES

This invention relates to the fabrication of fiber reinforced resin articles, and in particular, to the fabrication of fiber reinforced furan resin articles, such as, for example fiber reinforced furfuryl alcohol resin articles.

Glass fiber reinforced furfuryl alcohol resin articles are well known, and are regarded as being particularly desirable for use as vessels, containers, and other articles used in systems requiring high degree of chemical resistance, high strength, structural stability, etc.

Such articles are commonly made by "hand lay up" techniques, for example. In such techniques, a fibrous reinforcement material such as, for example, fiber mat such as chopped strand mat, woven roving, or the like, is embedded in a pre-applied layer of liquid resin on a shaping element. For example, a gel coat of resin, can be applied to a shaping element, and the fibrous reinforcement applied thereto and embedded therein, with a roller, by hand, for example, to homogeneously distribute the liquid resin throughout the fibrous reinforcement, and to work out air voids, and the like. Liquid resin is then applied to the first ply of fibrous reinforcement, and another ply is worked in. After applying another layer of resin, an additional layer of fibrous reinforcement can be applied, and the procedure repeated as desired. In some instances resin is worked into pre-applied fibrous reinforcement, and in some instances chopped strand mat is used in alternate layers with woven roving, for example.

This invention is not directed to that aspect of the fiber-reinforced resin fabrication art known as pre-preg or pre-mix molding. In the pre-preg technique, resin is pre-distributed on the fibrous reinforcement, typically stored under refrigeration, and eventually pressed against a shaping surface and heat cured. In pre-mix molding, resin, reinforcement, fillers, etc., not in web form are usually prepared by the molder prior to the time of use. This process is also known as bulk molding or dough molding and is used typically in pressure molding fabrication of solid articles, as distinguished from laminates. The shaped mass is heated to trigger the catalyst, e.g., the mold is heated.

For hand lay up work, it is desirable that the viscosity of the liquid resin be low enough to provide ready penetration of the liquid throughout the fibrous reinforcement, and to provide minimum tendency of the resin to remain adhering to the roller or other working tool. When the viscosity is too high, the rollers tend to adhere to the resin in the applied reinforcement material-liquid-resin mass, with the result that the highly viscous reinforcement material-liquid-resin mass can be disrupted or literally torn apart as the roller is withdrawn therefrom. In addition to developing minimal cohesion between the applied fiber-resin layer and the resin-wetted working roller the lower viscosity resins enhance the working-out of air bubbles from the fiber-resin layer.

On the other hand higher viscosities are desirable inasmuch as less shrinkage is encountered upon cure, and inasmuch as more tolerable exotherms are usually encountered. Relatively high initial viscosity is a characteristic of liquid resins in which the early stages of polymerization have been carried out at least to some extent in a suitable reactor. Naturally, this controlled advancement of the resinification or condensation reaction involves generation and dissipation of whatever exotherm is encountered with that particular degree of advancement. Consequently, the extent of polymerization or condensation which can be encountered after that resin is catalyzed and applied to the shaping element is diminished by the degree to which the precondensation was carried out in a reactor. Hence, more advanced resin, that is, resins having higher viscosity, relatively speaking, are also characterized as exhibiting diminished exotherms during the course of cure of the fabricated article.

In filament winding, a filament is embedded in a resin-wetted mass while a shaping element is rotated at high speeds, for example.

Thus it will be appreciated that the viscosity of the liquid resin, in hand layup and other fabrication of fiber reinforced furan resin, that is, the viscosity at the moment of contact between the resin and fiber, is an extremely important factor in determining the success of the operation.

Hand layup techniques differ dramatically from pre-preg techniques with respect to catalyst requirements. Pre-preg catalysts must remain dormant for long periods of time and are usually activated by elevated temperatures. Hand layup requires fast-curing catalyst resin system, and yet requires a substantial working life. However, using some known furfuryl alcohol resin catalysts, e.g., aniline hydrochloride, an immediate and abrupt increase in viscosity of the liquid resin is encountered. Hence, when such catalyst and liquid resin are admixed, the liquid resin system is in a state of rapid and immediate change in viscosity and this abrupt change in viscosity continues during the so-called "bench life." Hence, during the relatively short "bench life," although the resin can be regarded as "workable," the resin is immediately and abruptly increasing in viscosity. Hence, upon being mixed with the catalyst, the resin may be relatively fluid and free flowing and, shortly thereafter, it may exhibit a relatively high viscosity. In heretofore available methods, it has been common for the viscosity of the resin to double upon being catalyzed, and before it is applied to the shaping element.

Moreover, the exotherm encountered in the catalyst-resin pot can be substantial, with the result that the rapid increase in viscosity is aggravated in the pot, and, in some instances, the temperatures can exceed the temperature at which steam is evolved.

Organic acid chlorides have been generally regarded as extremely fast catalysts and hence unsuitable for fabrication techniques requiring substantial working life.

Use of slowly catalyzed systems, for example by reducing the concentration of "too-fast" catalysts, has been proposed as an expedient to overcome the high reaction rate of catalysts such as aniline hydrochloride, and to provide a "bench life" in which the viscosity of the catalyzed liquid resin is, relatively speaking, stabilized. Such systems, however, are usually characterized by a more slowly but definitely continuously increasing viscosity with all the advantages of the increasing viscosity. Moreover, at room temperatures the slow reaction rate appears to continue after the so-called "bench life" period of time has elapsed, with the result that low strength, low chemical resistance, and poor stripability is observed in such systems. In addition, oven curing or the like has been essential for development of physical properties of the fabricated article. However, even after oven curing the low concentration of the "too-fast" catalysts have been found to give insufficient hardness and poor chemical resistance.

A major complaint from fabricators who have used those resin-catalyst systems which have a relatively slow cure rate at ambient temperature in the fabrication of hand layup fiber reinforced articles is the fact that such systems require the use of ovens, heat lamps, and other similar heating devices to reduce the cure cycle to the extent necessary to facilitate rapid "turnover" of molds and in overall increase in mold production rate efficiency.

It is an object of the present invention to provide a method of fabricating fiber reinforced furan resin articles such as, for example furfuryl alcohol resin articles, which is characterized by a working period of time in which the catalyzed resin exhibits relatively stable viscosity.

It is another object of the present invention to provide a method of fabricating fiber reinforced resin articles which is characterized by a relatively fast but controllable room temperature cure rate after the initial working period has lapsed, with the result that the cured article exhibits excellent stripability, high strength, and outstanding chemical resistance.

It is a further object of the present invention to provide a method of fabricating fiber reinforced resin articles in which the fabricator can select a predetermined viscosity liquid resin material in accordance with the particular needs of the particular article being fabricated, and in which the viscosity of the liquid resin will not abruptly change during the working period of time in which the fiberous reinforcement is being embedded into the liquid resin.

It is a further object of the present invention to provide a method of fabricating fiber reinforced furfuryl alcohol resin articles in which the liquid catalyst system has improved "room temperature cure" characteristics, and which does not require the use of ovens, heat lamps, or similar heating devices to reduce cure cycles.

All these and other objects which will be apparent hereinafter are achieved in accordance with the present invention in which the catalyzed furan resin system employed comprises, for example, furfuryl alcohol-derived binder having homogeneously admixed therein an effective catalytic amount of a special aromatic or heterocyclic acid chloride. The special aromatic or heterocyclic acid chloride which is contemplated for use in accordance with the present invention includes those aromatic and heterocyclic acid chlorides which, when used in an amount sufficient to provide 1 percent hydrolyzable chloride based on the weight of the catalyzed resin system will give a gel time between 8 and 120 minutes, preferably in the range of 8–40 minutes inclusive. The terms effective catalytic amount, hydrolyzable chloride, catalyzed resin system, and gel time, are defined hereinafter. The term effective catalytic amount means that amount of the catalyst which will effectively cure the resin at room temperature to render the laminate strippable within 24 hours. Generally speaking catalyst concentrations herein are expressed as percent hydrolyzable chloride and an amount between 0.5 and 2 percent inclusive, expressed as percent hydrolyzable chloride, is effective and about 1 percent is preferred when the contemplated catalysts as defined herein are employed.

The percent hydrolyzable chloride in a catalyst is calculated on the basis of theoretical stoichiometry and on the structural formula of the acid chloride in question. For the purpose of this calculation all the chlorine atoms attached directly to the carbonyl carbon are regarded as hydrolyzable and chlorine atoms attached to a phenylene or other carbon are regarded as being non-hydrolyzable.

As used herein, the catalyzed resin system used in the gel time test or fabrication method is the admixture of the special catalyst defined above and the particular resin binder system which is being employed in the particular test or fabrication method. Hence, the catalyzed resin system which is used to determine the gel time is the system which includes the catalysts, the particular resin binder, including any other additives, modifiers, or impurities, such as water, for example, which would be present in the resin used in the test or fabrication method.

The furan binders contemplated for use in accordance with the present invention and which are used in the gel time test to determine catalysts for use in accordance with this invention include furfuryl alcohol resins, furfuryl alcohol-formaldehyde resins, furfuryl alcohol-furfural-formaldehyde resins, furfuryl alcohol-phenol resins, furfuryl alcohol-urea-formaldehyde resins, furfuryl alcohol-urea-phenol resins, furfural phenol resins, and the like wherein the resins have a viscosity between 200 cps and 1,000 cps at 25°C. Preferred resins for hand layup have a viscosity between 350–650 cps at 25°C. It is noted that furfural and furfuryl alcohol monomers per se are not contemplated for use as resin binders in accordance with the present invention, although it is to be understood that in a particular resin system, substantial portions of the resin binder can include furfuryl alcohol monomer and furfural monomer, e.g., up to about 50 percent by weight based on the weight of the resin.

Preferred resins are described in U.S. Pat. Nos. 3,594,345 and 3,681,286 issued to Brown and Watson for "Fiberglass Laminates Containing Furfuryl Resin Binder." These preferred resins comprise furfuryl-formaldehyde resin containing formaldehyde-furfuryl alcohol ratio of 0.25 to 1. Furfural in an amount between 5–25 percent of the composition is added as monomer after prepolymerization and distillation of the furfuryl alcohol formaldehyde resin.

As used herein, gel time is that amount of time which is required for a 150 gram sample of the resin to which the catalyst has been added at 25°C. to cure to a viscosity of 50,000 cps upon being charged to a paper cup container immediately after admixing of the catalyst and being stirred. A number 358 Dixie (T.M.) paper cup or a 8SN Lily (T.M.) cup is satisfactory for use in the gel time test. The liquid mass is typically ⅞ inches deep and 3 ½ inches in diameter at the top during the test in these cups.

A preferred method for determining gel time in accordance with the definition for characterizing catalysts useful in accordance with the present invention involves the use of an automatic gel timer such as, for example, the Randolph Gel Timer— 100 (T.M. Shyodu Precision Instrument Co.). This gel timer is a device for determining the gel time of resinous plastics, drying oils, adhesives and two-component elastomers, paints and the like. The apparatus consists of a timer and means for slowly rotating a specially shaped stirrer in a sample mass of resin or elastomer. The rotating means includes a low torque synchronous motor. As viscosity increases, it eventually reaches a level at which the drag exceeds the torque of the motor. In this preferred embodiment, the stall torque is encountered when viscosity of the test material exceeds 50,000 cps. It is noted that even though the test is carried out at ambient room temperature conditions, typically 25°C. in some samples, the sample temperature will be above 25°C. due to reaction exotherm, at the moment the 50,000 cps viscosity is reached. Starting temperature is precisely 25°C. however. When the motor stalls, the timer is automatically stopped wherein the gel time can be read directly from the timer by the operator. It should be noted that the rate of cure of the catalyzed resin in the cup is apt to continue to increase with such vigor that the temperature of 100° will be exceeded whereby the water which is generated as a consequence of the condensation reaction of the resins will be converted into steam. Depending on the rate of increase of temperature, this conversion to steam may merely result in an expansion or foaming of the sample resin, or it may result in dangerous spattering of the pot contents. Hence, the technician must take appropriate steps to place the gelling resin sample in a safe location.

We have discovered that, in accordance with the present invention, when the defined heterocyclic or aromatic acid chlorides are used to catalyze the furan resin system used in hand layup fabrication the viscosity of the resin system does not change unduly during the working time until gellation commences to a substantial degree. Thereupon the rate of reaction proceeds at a very fast pace with the result that the laminated form develops sufficient hardness in relatively short periods of time to render the laminated form, for example, readily strippable; and upon further room temperature cure, high strength and chemical resistance, e.g., corrosion resistance, is acquired.

It has been found that those acid chlorides which provide gel times in excess of 120 minutes do not provide sufficient hardness development at room temperature to provide satisfactory strippability.

On the other hand, those acid chlorides which provide a gel time less than 8 minutes have been found to rapidly develop high viscosities and these catalysts present all the disadvantages of the usual rapid cure catalysts for furan resin systems, including, the danger and hazard incurred as a consequence of the exotherm in over catalyzing a mass of furan resin. When these "too fast" acid chlorides are used in lower concentrations in the resins, in order to provide a bench or working life of 10–20 minutes, for example, the resulting article is insufficiently cured, even upon oven cure, to give desired hardness and chemical resistance.

A typical lay up procedure is set forth below. The following lay up laminate fabrication procedure is used, in accordance with this invention, to determine hardness as reported in the examples. In the test, a Mylar film is supported on a flat plywood surface. A thin layer of catalyzed resin is applied to wet the film. One layer or ply of 10 mil. (nominal) C-glass, chemical resistant surfacing veil is applied to the film of resin. This is rolled with a serrated or corregated roller until the resin precoat has thoroughly wet all the glass, all air is removed, and the veil has become embedded in the resin film. Another increment of resin is added and distributed and a one and one-half ounce chopped strand mat ply is added and rolled into and embedded into the resin. This process is continued until the laminate consists of the veil, three plies of chopped strand and finally a second finish ply of veil has been incorporated into the laminate. The cure time starts at the time at which the catalyst is admixed with the resin. It requires about 5 minutes to prepare a 3 × 5 inch test laminate.

The method of the present invention is not limited to the above procedure, nor is it limited to the use of glass fiber reinforcement, although glass fiber reinforcement is preferred.

As used herein, and in the appended claims, all percents (%), are expressed in percent by weight based on the weight of the composition under discussion, unless otherwise noted, all weights are in parts by weight, and all temperatures are expressed in degrees centigrade.

The following examples are provided for illustration only and the scope of the invention is not to be unduly limited thereby. Nonetheless, it will be apparent from the following examples that a large number of acid chlorides are not contemplated for use in accordance with the present invention and, indeed, are not suitable for use in accordance with the present invention. In addition to naming a large number of acid chlorides which are contemplated for use in accordance with the present invention, it is possible, in accordance with this disclosure, to determine by means of a simple gel time test, all those acid chlorides which are suitable for use in accordance with the present invention for the purpose of developing readily strippable high strength high chemical resistant furan resin bound, fiber-reinforced articles.

EXAMPLE 1

A furfuryl alcohol resin was prepared as in Example 2 in U.S. Pat. No. 3,594,345 except that the final distillation step is terminated sooner to provide a lower viscosity (e.g., 16,000 cps at 25°C) whereby dilution with about 25 percent furfural monomer will provide a final viscosity of about 400 cps. This resin is then placed in a container in a constant temperature bath until it is at precisely 25°C. A 150 parts by weight sample of this resin is admixed with an acid chloride in an amount sufficient to provide 1 percent hydrolyzable chloride based on the weight of the resin. This procedure is repeated to test a large number of respective acid chlorides to determine the gel time. The gel time is determined by placing the 150 grams of the catalyzed resin system in an eight ounce capacity paper cup as indicated above, placing a "Randolph Gel Timer— 100" stirrer therein, and connecting the stirrer to the Randolph gel timer. The operation of the timer is commenced immediately upon addition of the resin catalyst; and, as soon as the viscosity of the resin-catalyst system exceeds approximately 50,000 cps, the gel timer shuts off automatically. The times observed and the identity of catalysts tested are set forth in Table 1 below.

TABLE I

| CATALYST | GEL TIME (Mins.) | HARDNESS | | |
|---|---|---|---|---|
| | | 19 hrs. at RT | 24 hrs. at RT | +2 hrs. at 82°C |
| * Benzoyl Chloride | 20.0 | 80 | 82.6 | 39 |
| O-toluoyl Chloride | 4.6 | | | |
| * M-toluoyl Chloride | 19.6 | 78.3 | 81 | 43 |
| * P-toluoyl Chloride | 20.2 | 78.1 | 79.6 | 38 |
| * O-chlorobenzoyl Chloride | 9.3 | 80.3 | 80.5 | 38 |
| * M-chlorobenzoyl | 10.5 | 80.1 | 81.3 | 41 |
| * P-chlorobenzoyl Chloride | 14.8 | 82.8 | 85 | 40 |
| M-Nitrobenzoyl Chloride | 5.5 | | | |
| P-Nitrobenzoyl Chloride | 4.7 | | | |
| * O-Phthaloyl Chloride | 8.6 | 80.8 | 81.6 | 45 |
| M-Phthaloyl Chloride | 6.8 | | | |
| * P-Anisoyl Chloride | 9.9 | 79.3 | 80.3 | 38 |
| Cinnanoyl Chloride | 2.6 | | | |
| Acetyl Chloride | 1.0 | | | |
| Acryloyl Chloride | 3.0 | | | |
| Butyroyl Chloride | 1.3 | | | |
| Lauroyl Chloride | 1.8 | | | |
| Pivaloyl Chloride | 2.4 | | | |
| * 2-Furoyl Chloride | 11.2 | | | |
| Succinoyl Chloride | 1.1 | | | |
| Adipoyl Chloride | 1.1 | | | |

*Indicates use of this acid chloride is within definition of invention.

It is apparent from consideration of Table I that none of the nonheterocyclic, nor nonaromatic acid chlorides fall within the gel time definition of catalysts for use in accordance with the present invention.

Moreover, it is apparent from a consideration of Table I that many of the aromatic acid chlorides do not qualify for use in accordance with the present invention. For example, even though m-toluoyl and p-toluoyl chlorides are eminently satisfactory for use in accordance with the present invention, o-toluoyl chloride is not. Also, even though o-phthaloyl chloride is suitable for use in accordance with this invention m-phthaloylis not. It was observed that, in addition to causing dangerous and eruptive exotherm in the gel time test pot, those samples exhibiting gel times less than 8 minutes resulted in completely unsatisfactory laminates because of blistering and other heat derived defects. Those catalysts which gave gel times less than 8 minutes were subsequently tested at reduced catalyst levels in the same resin system, and it was found that, in each instance, they were unsatisfactory. With respect to attempts to utilize the "too-fast" acid chloride, in most instances a catalyst concentration less than 0.5 percent in the resin was required to give gel times over 8 minutes. However, these low catalyst concentrations led to insufficient curing, completely unacceptable strippability and completely unacceptable hardness at room temperature cure. Furthermore, elevated temperature cure give inadequate resinification for achievement of necessary hardness and chemical resistance which is otherwise characteristic of furan-derived resin articles. For example, cinnamoyl chloride was too fast, and required 0.25 percent to give a 20 minute gel time. But, at this catalyst concentration using this catalyst, the laminate developed only 36 (shore D) hardness after 24 hours at room temperature. After two additional hours at 82°C it achieved a Barcol hardness of 16. Lauroyl chloride gave comparable results at each of the concentrations discussed above. The data set forth in Table I under "hardness" represents hardness of laminated piece fabricated by hand lay up techniques as set forth above, in accordance with this invention. Hardness values are expressed as Shore D hardness, except that those numbers which are underscored represent Barcol hardness numbers. The hardness tests are determined on a laminated article formed by hand lay up in which glass fiber mat is embedded in the furfuryl alcohol binder used in the gel time test as described in the laminate fabrication procedure set forth hereinbefore and wherein the mat is used in sufficient quantity to provide between 25 ± 2 percent by weight based on the weight of the formed, uncured article, e.g., 1 part glass mat and 3 parts catalyzed resin. The hardness values obtained after 2 hours at 82°C are given to illustrate what is regarded as ultimate or eventual hardness at room temperature.

EXAMPLE 2

A number of respective hand lay up laminated articles are formed using 3 parts of a furfuryl alcohol resin binder used in Example 1, and 1 part a fiber reinforcement at ambient room temperature conditions using the lay-up procedure set forth above. In separate respective tests 6 chlorides were used in various levels with this resin, e.g., at 0.75 percent and at 1.5 percent hydrolyzable chloride levels. The hardness is tested at 24 hours at room temperature, after further curing for 2 additional hours at 82°C, and after still further curing for 1 more additional hour at 100°C., to illustrate eventual or ultimate hardness. The results of these tests are set forth in Table II, in which those numbers having an underscore present represent the Barcol hardness, and those numbers which are not underscored represent Shore D hardness.

TABLE II

| ACID CHLORIDE CATALYST | HARDNESS | | | | | |
|---|---|---|---|---|---|---|
| | At 1.5% (hydrolyzable chloride) Catalyst | | | At 0.75% (hydrolyzable chloride) Catalyst | | |
| chloride) Catalyst | 24 hrs. at RT | +2 hrs. at 82°C | +1 hr. at 100°C | 24 hrs. at RT | +2 hrs. at 82°C | +1 hr. at 100°C |
| Benzoyl | 24 | 48 | 52 | 75 | 37 | 46 |
| M-Toluoyl | 27 | 48 | 54 | 74 | 38 | 43 |
| P-Toluoyl | | 42 | 48 | | | |
| P-Anisoyl | | | | 74 | 39 | 48 |
| P-Chlorobenzoyl | | | | 75 | 35 | 45 |
| Phthaloyl | | | | 74 | 39 | 45 |

The Barcol scale begins at a reading of about 85 on the Shore D scale. A Shore D hardness rating of 70 is required to give good strippability, generally speaking. The Shore D 70 hardness requirement for strippability is deemed reliable whether a Mylar (T.M.) film is to be peeled from the laminate, or whether the laminate will be removed from most intricately shaped practical waxed metal molds, for example. On the other hand, at this state of cure the sheer weight of the article may be so great or the particular configuration of the articles may be such that it would be undesirable to separate the laminate from adequate physical support until the cure proceeds even further in order to permit the laminate to develop to sufficient structural strength to be non-deformable. However, the gravity-induced deformability is a consequence of the shape and weight of the article, and must be viewed as a factor which is separate and distinct from "strippability."

The data of Table II, even at catalyst levels corresponding to 0.75 percent hydrolyzable chloride show that the laminates in accordance with the present invention were readily strippable within 24 hours at room temperature cure.

To assist one in evaluating the data set forth in Table I and Table II herein, it has been found that laminates produced in accordance with the present invention having Barcol value in excess of 30-35 had developed sufficient chemical resistance to pass the traditional acetone wipe test. However, those laminates having Barcol readings in excess of 35-40 are believed near the ultimate chemical resistance characteristic of furan resin-bound articles.

It will be apparent to those with ordinary skill in the art that many modifications and alterations can be made in light of the above disclosure without departing from the spirit and scope of the present invention. For example, the numbered examples are provided for illustration purposes only, and it is not to be construed, for example, that the method of the present invention is limited to the fabrication of 5-ply glass fiber strand mat articles. Also, the findings set forth in the numbered examples with respect to tests employing the specific illustrated resins are equally valid with respect to furan resins generally, and, particularly, with respect to the furan resins set forth hereinbefore.

It will also be apparent to those skilled in the art that in fabricating a laminate in accordance with the present invention, in alternate application of resin binder and fibrous reinforcement, processes in which fibrous reinforcement is first applied are entirely equivalent to processes in which the resin is applied first.

We claim:

1. A method of fabricating fiber reinforced furan resin bound articles comprising the steps: applying a catalyzed liquid furan resin binder to a surface; and embedding fiber reinforcement in the layer; said catalyzed furan resin binder comprising a liquid furan resin having homogeneously admixed therein an effective catalytic amount of aromatic or heterocyclic acid chloride selected from those acid chlorides which, when present in said furan resin in an amount sufficient to provide 1 percent hydrolyzable chloride based on the weight of the resin, will give a gel time between 8 and 120 minutes.

2. The method of claim 1 wherein said furan binders are selected from the group furfuryl alcohol resins, furfuryl alcohol-formaldehyde resins, furfuryl alcohol-furfural-formaldehyde resins, furfuryl alcohol-phenol resins, furfuryl alcohol-urea-formaldehyde resins, furfuryl alcohol-urea-phenol resins, and furfural-phenol resins, and wherein said binder has a viscosity of between 200 cps and 1,000 cps inclusive at 25° prior to the addition of the catalyst thereto.

3. The method of claim 1 wherein the fiber reinforcement is a member selected from the group consisting of glass strand mat and woven glass fabric and wherein said binder has a viscosity between 350–650 cps inclusive at 25°C. prior to the addition of the catalyst thereto.

4. A method of fabricating glass fiber reinforced furan resin bound articles comprising the steps: applying a layer of catalyzed liquid furan resin to a shaping surface; embedding in said layer a reinforcing member selected from the group glass strand mat and woven glass fibers; said catalyzed liquid furan resin comprising liquid furan resin having homogeneously admixed therewith an effective catalytic amount of aromatic or heterocyclic acid chloride selected from those acid chlorides which, when present in said liquid furan resin in an amount sufficient to provide 1 percent hydrolyzable chloride based on the weight of the resin will give a gel time between 8 and 40 minutes, said applying and said embedding taking place at ambient room conditions; permitting said resin to cure at ambient room conditions and separating the resulting cured reinforced resin article from the shaping surface.

5. The method of claim 4 wherein the furan resin binder is selected from the group consisting of furfuryl alcohol resins, furfuryl alcohol-formaldehyde resins, furfuryl alcohol-furfural-formaldehyde resins, furfuryl alcohol-phenol resins, furfuryl alcohol-ureaformaldehyde resins, furfuryl alcohol-urea-phenol resins, and furfural-phenol resins, wherein the resin has a viscosity between 200 cps. and 1,000 cps. inclusive at 25°C. prior to admixing of the catalyst therewith.

6. The method of claim 4 wherein the binder has a viscosity between 350–650 cps at 25°C. prior to admixing the catalyst therewith.

7. The method of claim 4 wherein the furan resin binder includes up to 50 percent by weight of furfuryl alcohol monomer, based on the weight of the resin.

8. A method of fabricating glass fiber reinforced furan resin bound laminates comprising the steps: repeatedly performing the steps comprising (a) and (b), wherein the step (a) comprises applying a layer of a catalyzed liquid furan resin binder to a shaping surface, and wherein step (b) comprises embedding in the layer a mat or fabric of glass fibers, and wherein the catalyzed resin binder comprises a liquid furan resin having homogeneously admixed therewith a catalystically effective amount of aromatic and heterocyclic acid chlorides selected from those acid chlorides which, when present in said resin in an amount sufficient to provide 1 percent hydrolyzable chloride based on the weight of the resin binder, will give a gel time between 8 and 40 minutes, inclusive; and repeating steps (a) and (b) until a plurality of plies of the fibrous reinforcement are embedded in the liquid furan binder; steps (a) and (b) being carried out at ambient room conditions; permitting the resultant laminate comprising said plurality of plies embedded in said binder to cure at ambient room conditions and separating the cured laminate from the shaping surface.

9. The method of claim 8 wherein the liquid furan binder is selected from the group consisting of furfuryl alcohol resins, furfuryl alcohol-formaldehyde resins, furfuryl alcohol-furfuryl-formaldehyde resins, furfuryl alcohol-phenol resins, furfuryl alcohol-urea-formaldehyde resin, furfuryl alcohol-urea-phenol resin, and furfuryl phenol resins, wherein the resins have a viscosity between 200 cps and 1,000 cps inclusive at 25°C.

10. The method of claim 8 wherein the liquid binder has a viscosity between 350–650 cps inclusive at 25°C.

11. The method of claim 8 wherein said catalytic amount is an amount of said catalyst sufficient to provide between 0.5 and 2 percent hydrolyzable chloride by weight based on the weight of the resin binder.

12. A method of fabricating fiber reinforced furan resin bound articles comprising the steps: applying a catalyzed liquid furan resin binder to a surface; and embedding fiber reinforcement in the layer; said catalyzed furan resin binder comprising a liquid furan resin having homogeneously admixed therein an effective catalytic amount of aromatic or heterocyclic acid chloride selected from those acid chlorides which, when present in said furan resin in an amount sufficient to provide 1 percent hydrolyzable chloride based on the weight of the resin, will give a gel time between 8 and 120 minutes wherein the acid chloride catalyst is selected from the group consisting of benzoyl chloride, m-toluoyl chloride, p-toluoyl chloride, o-chlorobenzoyl chloride, m-chlorobenzoyl chloride, p-chlorobenzoyl chloride, o-phthaloyl chloride, p-anisoyl chloride, and 2-furoyl chloride.

13. The method of claim 12 wherein said furan binders are selected from the group furfuryl alcohol resins, furfuryl alcohol-formaldehyde resins, furfuryl alcohol-furfural-formaldehyde resins, furfuryl alcohol-phenol resins, furfuryl alcohol-urea-formaldehyde resins, furfuryl alcohol-urea-phenol resins, and furfural-phenol resins, and wherein said binder has a viscosity of between 200 cps and 1,000 cps inclusive at 25° prior to the addition of the catalyst thereto.

14. The method of claim 12 wherein the fiber reinforcement is a member selected from the group consisting of glass strand mat and woven glass fabric and wherein said binder has a viscosity between 350–650 cps inclusive at 25°C. prior to the addition of the catalyst thereto.

15. A method of fabricating glass fiber reinforced furan resin bound articles comprising the steps: applying a layer of catalyzed liquid furan resin to a shaping surface; embedding in said layer a reinforcing member selected from the group glass strand mat and woven glass fibers; said catalyzed liquid furan resin comprising liquid furan resin having homogeneously admixed therewith an effective catalytic amount of aromatic or heterocyclic acid chloride selected from those acid chlorides which, when present in said liquid furan resin in an amount sufficient to provide 1 percent hydrolyzable chloride based on the weight of the resin will give a gel time between 8 and 40 minutes wherein the acid chloride catalyst is selected from the group consisting of benzoyl chloride, m-toluoyl chloride, p-toluoyl chloride, o-chlorobenzoyl chloride, m-chlorobenzoyl chloride, p-chlorobenzoyl chloride, o-phthaloyl chloride, p-anisoyl chloride and 2-furoyl chloride, said applying and said embedding taking place at ambient room conditions; permitting said resin to cure at ambient room conditions and separating the resulting cured reinforced resin article from the shaping surface.

16. The method of claim 15 wherein the furan resin binder is selected from the group consisting of furfuryl alcohol resins, furfuryl alcohol-formaldehyde resins, furfuryl alcohol-furfural-formaldehyde resins, furfuryl alcohol-phenol resins, furfuryl alcohol-urea-formaldehyde resins, furfuryl alcohol-urea-phenol resins, and furfural-phenol resins, wherein the resin has a viscosity between 200 cps. and 1,000 cps. inclusive at 25°C. prior to admixing of the catalyst therewith.

17. The method of claim 15 wherein the binder has a viscosity between 350–650 cps at 25°C. prior to admixing the catalyst therewith.

18. The method of claim 15 wherein the furan resin binder includes up to 50 percent by weight of furfuryl alcohol monomer, based on the weight of the resin.

19. A method of fabricating glass fiber reinforced furan resin bound laminates comprising the steps: repeatedly performing the steps comprising (a) and (b), wherein the step (a) comprises applying a layer of a catalyzed liquid furan resin binder to a shaping surface, and wherein step (b) comprises embedding in the layer a mat or fabric of glass fibers, and wherein the catalyzed resin binder comprises a liquid furan resin having homogeneously admixed therewith a catalystically effective amount of aromatic and heterocyclic acid chlorides selected from those acid chlorides which, when present in said resin in an amount sufficient to provide 1 percent hydrolyzable chloride based on the weight of the resin binder, will give a gel time between 8 and 40 minutes, inclusive wherein the acid chloride is selected from the group consisting of benzoyl chloride, m-toluoyl chloride, p-toluoyl chloride, o-chlorobenzoyl chloride, m-chlorobenzoyl chloride, p-chlorobenzoyl chloride, o-phthaloyl chloride, p-anisoyl chloride, and 2-furoyl chloride, and repeating steps (a) and (b) until a plurality of plies of the fibrous reinforcement are embedded in the liquid furan binder; steps (a) and (b) being carried out at ambient room conditions; permitting the resultant laminate comprising said plurality of plies embedded in said binder to cure at ambient room conditions and separating the cured laminate from the shaping surface.

20. The method of claim 19 wherein the liquid furan binder is selected from the group consisting a furfuryl alcohol resins, furfuryl alcohol-formaldehyde resins, furfuryl alcohol-furfuryl-formaldehyde resins, furfuryl alcohol-phenol resins, furfuryl alcohol-urea-formaldehyde resin, furfuryl alcohol-urea-phenol resin, and furfuryl phenol resins, wherein the resins have a viscosity between 200 cps and 1,000 cps inclusive at 25°C.

21. The method of claim 19 wherein the liquid binder has a viscosity between 350–650 cps inclusive at 25°C.

22. The method of claim 19 wherein said catalytic amount is an amount of said catalyst sufficient to provide between 0.5 and 2 percent hydrolyzable chloride by weight based on the weight of the resin binder.

* * * * *